United States Patent [19]

McRae

[11] Patent Number: 5,063,266
[45] Date of Patent: Nov. 5, 1991

[54] NON-HALOGENATED INSULATION WITH HIGH OXYGEN INDEX

[75] Inventor: Howard F. McRae, Underhill, Vt.

[73] Assignee: Champlain Cable Corporation, Winooski, Vt.

[21] Appl. No.: 482,386

[22] Filed: Feb. 20, 1990

[51] Int. Cl.$^5$ .............................. C08J 3/28; C08K 5/24
[52] U.S. Cl. .................................... 524/269; 524/265; 524/436; 524/437
[58] Field of Search ................. 524/265, 269, 436, 437

[56] References Cited

U.S. PATENT DOCUMENTS

| 4,387,176 | 6/1983 | Frye | 524/437 |
| 4,430,470 | 2/1984 | Taniguchi et al. | 524/269 |
| 4,732,939 | 3/1988 | Hoshi et al. | 524/436 |

FOREIGN PATENT DOCUMENTS 0393959 4/1990 European Pat. Off. .

Primary Examiner—Paul R. Michl
Assistant Examiner—U. K. Rajguru
Attorney, Agent, or Firm—Salzman & Levy

[57] ABSTRACT

The invention features in synergistic combination a new chemistry for fabricating wire and cable insulation and heat-shrinkable tubing and an irradiation process for providing the insulation with both increased tensile strength and increased elongation.

The chemistry utilizes a polycondensation-type process wherein a hydrophobic olefinic terpolymer base material having 3% or less carboxyl groups and a hydrophilic flame retardant filler material containing hydroxyl groups is linked to a silicone material containing silanol groups.

The insulation is further characterized by an oxygen index in excess of 50.0, resulting from high loadings of the fire retardant filler material, generally in excess of 200 parts by weight of the total material weight.

36 Claims, No Drawings

NON-HALOGENATED INSULATION WITH HIGH OXYGEN INDEX

FIELD OF THE INVENTION

The present invention relates to a new non-halogenated wire and heat-shrinkable tubing insulation article having superior elongation and tensile strength as well as flame retardancy, and more particularly to an insulation featuring a non-halogenated system whose composition and physical properties are achieved by a new synergy of advanced chemistry and irradiation processing.

BACKGROUND OF THE INVENTION

It has been known that superior insulating construction materials such as tiles and wall boards can be achieved by a polycondensation process whereby carboxyl groups forming part of an olefinic base are linked with silanol groups contained in a silicone material. Additionally, the silanol groups are linked with hydroxyl groups contained in a hydrated fire retardant filler to provide an insulation composition that tolerates large inclusions of the filler material. Such a process is disclosed and described in European patent application publication No. EP 0 333 514 A1.

While the process claimed that the cross-linking had allowed for the inclusion of larger amounts of fire retardant filler materials into the insulative composition, it was soon discovered that these compositions could not be processed into wire insulation of commercial quality.

One of the drawbacks of the chemistry was that the compositions taught by the subject patent application could not be easily extruded.

Another difficulty with the new insulative compositions was their characteristically sub-standard commercial tensile strength, elongation and flexibility.

It was soon determined that the increased cross-linking of these compositions, while improving the fire retardancy by reason of providing for increased filler loadings, nonetheless was overly binding the polymer chains. Thus, flexibility and elongation were impaired. Such over-binding, while useful for tiles and wall construction materials, which are not commercially affected by the reduced flexibility and elongation, is not useful for wire and cable insulation applications.

The present invention reflects the discovery that commercial grade insulation for wire and cable, particularly plenum wire and cable and heat-shrinkable tubing, can be fabricated by appreciably reducing the cross-linking of the components of the polycondensation process.

The chemistry of the aforesaid patent application utilized olefinic base materials containing 6% carboxyl groups by weight. This amount of the carboxyl groups is too high a percentage for fabricating commercial grades of wire insulation.

The present invention has determined that the viable range of carboxyl groups should be approximately below 3% by weight and preferably about 1% by weight of the base material.

In addition, while the prior application stressed the need to include dialdehydes to promote the cross-linking of the compositional components, the present invention reflects the discovery that they are detrimental to the processing of the insulation extrudate. The dialdehydes generally increase the viscosity beyond workable extrusion limits. Also, the dialdehydes reduce the temperatures at which the extrusion can be accomplished, thus further increasing the working viscosity, and further impairing the processability of the resultant composition. Compositions containing the dialdehydes were found to cause the extrusion heads to rupture due to increased pressure and viscosity. The prior application teaches the necessity for the inclusion of the dialdehydes, but that is because the formulations set forth therein relate primarily to construction materials and not to wire insulation.

The prior patent application further teaches the inclusion of an ethylene propylene elastomer in wire insulation compositions. These terpolymer blends were illustrative of the preferred wire insulation compositions, but subsequent testing revealed that they provided wire insulation with only marginal physical properties.

The current invention features a true terpolymer system rather than a blended terpolymer system. The terpolymers of the invention comprise a carboxylated ethylene vinyl acetate, without the inclusion of the elastomer, in order to improve the flexibility and the amount of filler that can be introduced into the system.

In addition to the changed chemistry, the invention subjected the new compositions to electron beam irradiation in order to improve the tensile strength, and to allow generally higher loadings of the flame retardant filler materials.

Normally, when greater amounts of filler materials are employed, the tensile strength and elongation decrease. Irradiation often improves tensile strength, but has never been found to increase the elongation. The present invention has shown that without the silanol groupings, the resultant composition will not show an increase in elongation after irradiation, as expected.

However, this invention incorporates the discovery that there is a synergy between the new chemistry and the irradiation, wherein the combination of the two processes (i.e., new chemistry and irradiation) provides for both an increase in tensile strength and in elongation.

This dual increase is valid for greater than 200 parts by weight of the inclusion of a hydroxyl-containing filler material into the terpolymer system.

Thus, the present invention has produced a new flame retardant wire and cable insulation with higher loadings of hydrated flame retardant fillers beyond those limits depicted in the aforementioned patent application. The effect of this new insulation on flame retardancy is dramatic, wherein the oxygen index for the new formulations is about 200% greater than the best wire and cable polycondensation formula.

Furthermore, the present invention has introduced the higher filler loadings without impairing the physical characteristics of the composition, whereby commercial grade insulation for a non-halogenated wire and cable is now feasible for the first time at these higher filler loadings.

The present invention features a non-halogenated composition for wire and cable and heat-shrinkable tubing insulation having superior flame retardancy, with oxygen indices approaching 70.0 or better. The inventive insulation is further characterized both by increased tensile strength and by increased elongation after irradiation, a result heretofore unknown in the prior art.

SUMMARY OF THE INVENTION

In accordance with the present invention, there is provided a non-halogenated insulation composition suitable for heat-shrinkable tubing, wire and cable, and plenum wire capable of passage of the rigorous UL910 plenum test, and whose insulation product has increased tensile strength and increased elongation.

The insulation is formed by irradiating a terpolymer composition comprising an ethylene vinyl acetate base material containing carboxyl groups. The ethylene vinyl acetate comprises approximately 100 parts by weight of the total composition, and the carboxyl groups comprise no more than approximately 3% by weight of the base. To the ethylene vinyl acetate is added a hydroxyl-containing fire retardant filler of greater than 200 parts by weight, and a silicone material comprising silanol groups, generally between 15 to 30 parts by weight. The vinyl acetate moiety is approximately between 25 to 30% by weight of the base material.

The oxygen indices of the formulations produced by this invention are extremely high, illustrating their vastly superior flame retardancy.

The composition is chemically formed by a polycondensation-type process wherein the carboxyl groups of the hydrophobic ethylene vinyl acetate link with the silanol groups of the silicone material, which also link with the hydroxyl groups of the hydrophilic flame retardant filler.

The irradiation of the composition in addition to the new chemistry provides a synergistic result, wherein both the tensile strength and the elongation increase, thus allowing still higher loadings of the flame retardant filler, such a result being heretofore unknown in the prior art.

The tensile strength of the insulation will range from approximately 2,000 psi to 1,000 psi, and is preferably greater than 1,500 psi.

The elongation will vary in a range of approximately from 450% t 370%.

The hydroxyl-containing fire retardant filler is preferably a magnesium hydroxide, although other hydrated and hydroxyl-containing substances, such as aluminum trihydrate, are within the scope and purview of the invention.

It will be observed that the hydrated filler loadings of this invention are approximately 300% or more greater than those illustrated in the prior art polycondensation formulations. The result of this vastly superior formulation is the achievement of greatly improved flame retardancy as illustrated by the oxygen indices ranging from approximately 42.0 to 72.0.

The objectives and advantages of this invention will become more apparent and will be better understood with reference to the following detailed description.

DESCRIPTION OF THE PREFERRED EMBODIMENT

Generally speaking, the invention features a synergistic combination of a new polycondensation-type process for formulating wire and cable and heat-shrinkable tubing insulation and an irradiation process to provide the new plenum insulation with vastly superior flame retardancy and physical strength and elongation.

The composition features a hydrophobic olefinic terpolymer system with hydrophilic flame retardant filler loadings greater than 200 parts by weight.

The irradiation process in combination with the new formulation of this invention has for the first time increased both the tensile strength and the elongation of the composition.

Normally, only the tensile strength would be expected to increase with irradiation, while the elongation percentage would decrease in value.

While the prior art teachings encourage a strong polycondensation reaction with carboxyl groups of the terpolymer system in a range of greater than 3% by weight, increasing all the way to 20% by weight of the base material, the present invention de-emphasizes the cross-linking reaction by drastically reducing the carboxyl groups to approximately below 3% by weight, and preferably to about 1% by weight of its base material.

Contrary to the prior art teachings, the use of a dialdehyde to enhance the chemical reaction is omitted to decrease the viscosity of the composition in order to improve the extrusion process. This omission not only improves extrusion, but allows extruding to be performed at higher temperatures of about 300 degrees F.

The present invention also eliminates the need for inclusion of a carboxylated elastomer, such as ethylene propylene, thus changing the character of the system from that of a terpolymer blend to that of a true (single component) terpolymer.

The following Tables 1a and 1b feature a comparison of polycondensation formulations with components expressed in parts by weight of the total composition. Control sample is a prior art formulation including both a glyoxal (dialdehyde) and an ethylene propylene (elastomer). It will be observed that the hydroxylated filler loading is only 112.5 parts by weight, and the oxygen index is only 33.0, after irradiation.

The ranges of hydrated filler loadings and oxygen indices for the present inventive formulations show vast superiority over the prior art formulation, called the control sample.

TABLE 1a

| Sample No. | Control | 190-39-1 | 224-20-1 | 224-20-4 |
|---|---|---|---|---|
| Ingredients | | | | |
| EEA 3330 | 37.5 | | | |
| EVA 1830 | 31.25 | | | |
| Elvax 4260 | | 100.0 | 100.0 | 100.0 |
| Elastomer | 31.25 | | | |
| Silicon Coupler | 15.0 | | | |
| A-172 | | 2.0 | | |
| SR-350 | | 6.0 | | |
| SFR-100 | | | 17.5 | 16.3 |
| Zinc Stearate | | 2.0 | 2.0 | 2.0 |
| Glyoxal | 1.88 | | | |
| ATH | 112.5 | | | |
| Kisuma 5B Mg(OH)$_2$ | | 225.0 | 270.0 | 225.0 |
| TiO$_2$ | 5.0 | | | |
| Zinc Borate | 15.0 | | | |
| Stabilizers | 0.625 | 7.0 | 7.0 | 7.0 |
| Before Irradiation | | | | |
| Tensile Strength | 2100 psi | | 1421 psi | 1487 psi |
| Elongation | 80% | | 436% | 473% |
| After Irradiation | | | | |
| Tensile Strength | 2614 psi | 2020 psi | 1709 psi | 1850 psi |
| Elongation | 133% | 347% | 463% | 520% |
| Oxygen Index | 33 | 53.1 | 49.1 | |

TABLE 1b

| Sample No. | 224-26-3 | 224-26-4 | 224-26-5 |
|---|---|---|---|
| Ingredients | | | |
| Elvax 4260 | 100.0 | 100.0 | |

TABLE 1b-continued

| Sample No. | 224-26-3 | 224-26-4 | 224-26-5 |
|---|---|---|---|
| Elvax 260 | | | 100.0 |
| SFR-100 | 20.4 | 22.6 | 17.5 |
| Zinc Stearate | 2.0 | 2.0 | 2.0 |
| Kisuma 5B Mg(OH)$_2$ | 315.0 | 350.0 | 270.0 |
| Stabilizers | 7.0 | 7.0 | 7.0 |
| Before Irradiation | | | |
| Tensile Strength | 1201 psi | 1052 psi | 496 psi |
| Elongation | 373% | 373% | 460% |
| After Irradiation | | | |
| Tensile Strength | 1525 psi | 1173 psi | 840 psi |
| Elongation | 426% | 370% | 490% |
| Oxygen Index | | 71.7 | 47.35 |

SR-350 is a trimethylolpropane trimethacrylate made by the Sartomer Co. of West Chester, PA.

SFR-100 is a silicone fluid made by General Electric Co. of Waterford, New York.

Kisuma 5B is a hydrated fire retardant containing approximately 97% magnesium hydroxide, made by the Kyowa Chemical Industry Co., Ltd., Osaka, Japan.

Elvax 4260 is an ethylene/vinyl acetate/acid terpolymer made by DuPont Corp. of Wilmington, Delaware.

The elastomer (ethylene propylene terpolymer) was made by Exxon Chemical Co.

EAA 3330 is made by Dow Chemical under the tradename Primacor.

EVA 1830 is manufactured by CIL of Canada.

Elvax 260 is an ethylene vinyl acetate copolymer manufactured by DuPont Corp. of Wilmington, Delaware.

All of the inventive formulations were fabricated by means of the following typical example, which included irradiation by an electron beam to impart radiation in the range from 5 to 20 Mega Rads, and preferably 10 Mega Rads.

EXAMPLE

Each of the ingredients of the aforesaid formulations were weighed and then added to a Banbury type intensive mixer. Each formulation was mixed until the polymer fluxed and the incorporation of the hydrated fillers yielded a homogeneous mass.

The composition was then converted into pellets, which were extruded onto a 20 AWG copper conductor. The thickness of the insulative composition was 0.030", producing a wire sample.

The wire samples were then tested for tensile strength and elongation using standard apparatus for this procedure.

After obtaining the tensile strength and elongation, identical samples were irradiated to a dose of 10 Mega Rads.

These irradiated samples were also tested for tensile strength and elongation, to provide the data in Tables 1a and 1b, as illustrated.

In order to better understand the new chemistry of this invention, a sample was also formulated without the use of a silanol-containing substance, as shown in Table 2 below. This sample was irradiated similarly to the samples in Tables 1a and 1b with the result that the irradiation only improved the tensile strength, but not the elongation. This demonstrates that the new chemistry in combination with the irradiation process is necessary to provide the inventive result.

TABLE 2

| Sample No. | 223-20-6 | 224-26-6 |
|---|---|---|
| Ingredients | | |
| Elvax 4260 | 100.0 | 100.0 |
| Stabilizers | 7.0 | 7.0 |
| Hydrated Alumina* | 291.0 | 270.0 |
| SR-350 | 16.7 | |
| Zinc Stearate | 2.0 | 2.0 |
| SFR-100 | 0 | 17.5 |
| Before Irradiation | | |
| Tensile Strength | 637 psi | 1332 psi |
| Elongation | 113% | 156% |
| After Irradiation | | |
| Tensile Strength | 1010 psi | 1402 psi |
| Elongation | 93% | 176% |
| Oxygen Index | 42.6 | 48.65 |

Since other modifications and changes varied to fit particular flame retardant and physical characteristics will be apparent to those skilled in the art, the invention is not considered limited to the examples chosen for purposes of disclosure, and is considered to cover all changes and modifications which do not constitute departures from the true spirit and scope thereof.

Having thus described the invention, what is desired to be protected by Letters Patent is subsequently presented by the appended claims.

What is claimed is:

1. A fire retardant, non-halogenated wire and cable insulation, featuring increased tensile strength and elongation resulting from irradiation of a composition including:
   a) an ethylene vinyl acetate base resin comprising approximately 100 parts by weight of the total composition, and containing carboxyl groups below approximately 3% by weight of said base resin;
   b) a silicone material containing silanol groups and comprising approximately between 15 to 30 parts by weight of the total composition; and
   c) a flame retardant hydrated filler material containing hydroxyl groups and comprising greater than 200 parts by weight of the total composition, said silanol groups linking both with the carboxylic groups of the ethylene vinyl acetate base resin, and the hydroxyl hydroxyl groups of the flame retardant hydrated filler material, said silanol groups having sufficient linkage with said carboxyl groups and said hydroxyl groups to provide said composition with a high, flame retardant, oxygen index, but having insufficient linkage capability to allow for extrusion of said composition into wire and cable insulation.

2. The fire retardant, non-halogenated wire and cable insulation of claim 1, wherein said vinyl acetate moiety is approximately between 25% to 30% of the base resin.

3. The fire retardant, non-halogenated wire and cable insulation of claim 1, wherein said fire retardant hydrated filler material comprises magnesium hydroxide.

4. The fire retardant, non-halogenated wire and cable insulation of claim 1, wherein said fire retardant hydrated filler material comprises hydrated alumina.

5. The fire retardant, non-halogenated wire and cable insulation of claim 1, having an oxygen index greater than 40.0.

6. The fire retardant, non-halogenated wire and cable insulation of claim 1, wherein elongation is in excess of 100%.

7. The fire retardant, non-halogenated wire and cable insulation of claim 1, wherein tensile strength is approximately in a range of between 1,000 and 2,000 psi.

8. The fire retardant, non-halogenated wire and cable insulation of claim 1, wherein elongation is in excess of 100% and tensile strength is greater than 1,000 psi.

9. The fire retardant, non-halogenated wire and cable insulation of claim 1, wherein said carboxyl groups comprise approximately 1% of said base resin.

10. A fire retardant, non-halogenated wire and cable insulation, comprising an irradiated composition whose tensile strength and elongation have both increased as a result of said irradiation, said composition including:
   a) an olefinic terpolymer base material comprising approximately 100 parts by weight of the total composition, and containing carboxyl groups below approximately 3% by weight of said base material;
   b) a silicone material containing silanol groups and comprising approximately between 15 to 30 parts by weight of the total composition; and
   c) a flame retardant hydrated filler material containing hydroxyl groups and comprising greater than 200 parts by weight of the total composition, said silanol groups linking both with the carboxylic groups of the olefinic terpolymer base material, and the hydroxyl groups of the flame retardant hydrated filler material via a polycondensation process, said silanol groups having sufficient linkage with said carboxyl groups and said hydroxyl groups to provide said composition with a high, flame retardant, oxygen index, but having insufficient linkage capability to allow for extrusion of said composition into wire and cable insulation.

11. The fire retardant, non-halogenated wire and cable insulation of claim 10, wherein said olefinic terpolymer comprises an ethylene vinyl acetate whose vinyl acetate moiety is approximately between 25% to 30% of the base material.

12. The fire retardant, non-halogenated wire and cable insulation of claim 10, wherein said fire retardant hydrated filler material comprises magnesium hydroxide.

13. The fire retardant, non-halogenated wire and cable insulation of claim 10, wherein said fire retardant hydrated filler material comprises hydrated alumina.

14. The fire retardant, non-halogenated wire and cable insulation of claim 10, having an oxygen index greater than 40.0.

15. The fire retardant, non-halogenated wire and cable insulation of claim 10, wherein tensile strength is greater than 1,000 psi and elongation is increased to more than 100%.

16. The fire retardant, non-halogenated wire and cable insulation of claim 10, wherein elongation is in excess of 100%.

17. The fire retardant, non-halogenated wire and cable insulation of claim 10, wherein tensile strength is approximately in a range of between 1,000 and 2,000 psi.

18. The fire retardant, non-halogenated wire and cable insulation of claim 10, wherein said carboxyl groups comprise approximately 1% of said base material.

19. A fire retardant, non-halogenated wire and cable insulation formed by a polycondensation process comprising, an irradiated composition whose tensile strength and elongation have both increased as a result of said irradiation, said composition including:
   a) a hydrophobic olefinic terpolymer base material containing carboxyl groups below approximately 3% by weight of said base material;
   b) a hydrophilic flame retardant hydrated filler material containing hydroxyl groups and comprising greater than 200 parts by weight of the total composition; and
   c) a silicone material containing silanol groups, said silanol groups linking both with the carboxylic groups of the hydrophobic olefinic terpolymer base material, and the hydroxyl groups of the hydrophilic flame retardant hydrated filler material via said polycondensation process, said silanol groups having sufficient linkage with said carboxyl groups and said hydroxyl groups to provide said composition with a high, flame retardant, oxygen index, but having insufficient linkage capability to allow for extrusion of said composition into wire and cable insulation.

20. The fire retardant, non-halogenated wire and cable insulation of claim 19, wherein said olefinic terpolymer comprises an ethylene vinyl acetate whose vinyl acetate moiety is approximately between 25% to 30% of the base material.

21. The fire retardant, non-halogenated wire and cable insulation of claim 19, wherein said fire retardant hydrated filler material comprises magnesium hydroxide.

22. The fire retardant, non-halogenated wire and cable insulation of claim 19, wherein said fire retardant hydrated filler material comprises hydrated alumina.

23. The fire retardant, non-halogenated wire and cable insulation of claim 19, having an oxygen index greater than 40.0.

24. The fire retardant, non-halogenated wire and cable insulation of claim 19, wherein elongation is in excess of 100%.

25. The fire retardant, non-halogenated wire and cable insulation of claim 19, wherein tensile strength is approximately in a range of between 1,000 and 2,000 psi.

26. The fire retardant, non-halogenated wire and cable insulation of claim 19, wherein said carboxyl groups comprise approximately 1% of said base material.

27. A method of fabricating insulation, comprising the steps of:
   a) linking carboxyl groups contained in a hydrophobic olefinic terpolymer base material with silanol groups contained in a silicone material;
   b) linking silanol groups of said silicone material additionally with hydroxyl groups contained in a hydrophilic fire retardant material, whereby said silicone material is linked to both said hydrophobic and hydrophilic materials; and
   c) irradiating the linked hydrophobic and hydrophilic materials to increase both tensile strength and elongation.

28. The method of claim 27, wherein said linking results from a polycondensation-type reaction.

29. The method of claim 27, wherein said hydrophilic flame retardant material is in excess of 200 parts by weight of the total weight of materials.

30. The method of claim 27, wherein said hydrophilic flame retardant material is in excess of 300 parts by weight of the total weight of materials.

31. The method of claim 27, wherein the linked materials are irradiated with approximately between 5 and 20 Mega Rads of radiation.

32. The method of claim 31, wherein the materials are irradiated with approximately 10 Mega Rads of radiation.

33. The method of claim 27, wherein said insulation has an oxygen index greater than 40.0.

34. The method of claim 27, wherein said insulation has an elongation greater than 100% and a tensile strength greater than 1,000 psi.

35. A non-halogenated flame retardant insulation having an oxygen index in the approximate range of between 40 and 72.

36. The non-halogenated flame retardant insulation of claim 35, wherein said oxygen index is greater than approximately 50.

* * * * *